July 13, 1943.   B. J. MURPHY   2,324,226
HAND GRIP FOR ELECTRIC IRONS
Filed July 5, 1941

Inventor
BERNARD J. MURPHY
By Howard Fischer
Attorney

Patented July 13, 1943

2,324,226

UNITED STATES PATENT OFFICE 2,324,226

HAND GRIP FOR ELECTRIC IRONS

Bernard J. Murphy, St. Paul, Minn.

Application July 5, 1941, Serial No. 401,229

1 Claim. (Cl. 38—95)

My invention relates to a cover for the handle of an iron, which is adapted to act as a heat shield to protect the hand from the heat transmitted to the handle by the handle supporting brackets, and also to form a cushion grip for the hand.

It is also a feature to provide a sponge rubber cover for the handle of an electric iron, which has a sufficient thickness to give a soft grip for the operator's hand.

Further, I provide a cover for the handle of a pressing iron which may be provided with longitudinally extending ribs forming an irregular gripping surface for the hand, and the body of the cover being made of porous or sponge rubber, so as to dissipate heat as well as providing a hand cushion.

The handle of a pressing iron is usually made of wood and has a hard smooth finish which the hand of the operator grips. Where the iron is used for any extended period, the operator's hand will tire from gripping the hard handle surface, and will also be subjected to the heat which is carried to the handle by the metal bracket ends which support the handle to the iron. I provide a cover which is made of rubber so that it can be stretched over the handle and over the metal ends of the handle supporting bracket to act as a heat shield and provide a soft cushion grip for the operator.

It is desirable that the cover be made of sponge rubber or a similar material which is largely porous, or is formed with little air pockets in the same, thus providing a means of shielding the hand from the heat, and at the same time forming a cushion as well as providing a non-slipping gripping means for the hand.

In one form of my handle cover, skirt-like depending portions hang free from the sides of the cover and are adapted to form free edges which are caused to be wrapped around the under side of the handle when the fingers of the operator grip the same. In this form, the cover is open longitudinally along the bottom so as to be stretched over and act as a hood-like covering over the entire handle and its connecting ends.

In another form of my handle where the iron is more or less of a streamlined formation, it is desirable to use a tubular handle cover which may be stretched over the handle of the iron in a manner to fully protect the same. Furthermore, the cushioning and nonskid gripping means provided by my sponge-like rubber cover is of primary importance, as it permits the operator to grip the handle of the iron without exerting as much force by the hand and fingers around the handle as where the old smooth types of handles are used. Thus the hand of the operator does not tire as quickly and is always cushioned by the spongy nature of my cover.

These features, together with other objects and details and advantages, will be more fully and clearly hereinafter described and set forth.

In the drawing forming a part of my specification:

Figure 1:
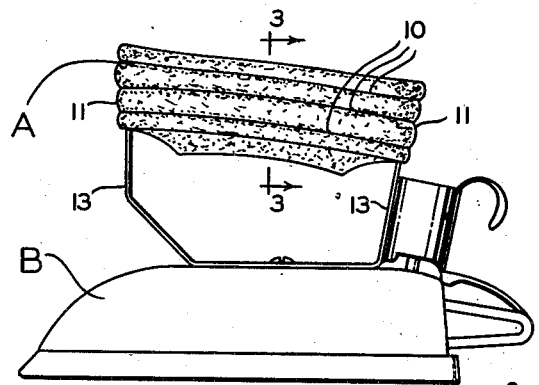
Figure 1 is a side view of an iron showing my cover stretched over the handle of the same.

My cover A is made of sponge rubber or other similar material having a series of air pockets formed therein, as well as being provided with longitudinally extending grooves 10. The cover A is formed with closed end portions 11 which are adapted to extend over the ends of the handle 12 forming an envelope-like cover. The ends 11 cover the portions of the metal brackets 13 which connect with the ends of the handle of the iron. The bracket 13 is secured to the top of the iron B and in normal use of the iron, the bracket carries some of the heat from the iron to the handle 12. Further, the connecting ends of the bracket 13 which are secured to the handle 12 become hot in the use of the iron B, and therefore it is desirable to provide the cover A with closed ends so as to cover and protect the operator from the hot ends of the bracket 13.

My cover A acts as a heat shield as well as a cushion grip for the hard wooden or nonmetallic handle portion 12. The surface of the handle portion 12 is hard and smooth, whereas my sponge-like cover A is soft and pliable and is adapted to form a cushion for the operator's hand.

In the envelope form of cover A, I provide side skirt portions 14 which depend on either side of the longitudinal opening 15 in the bottom of the cover A.

Figure 3:
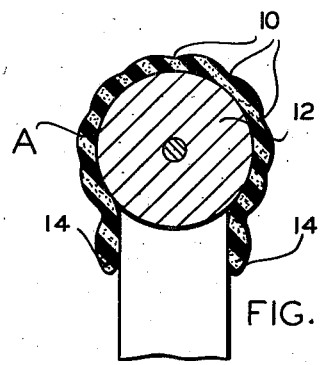
Figure 3 is a section on the line 3—3 of Figure 1.
Figure 4:
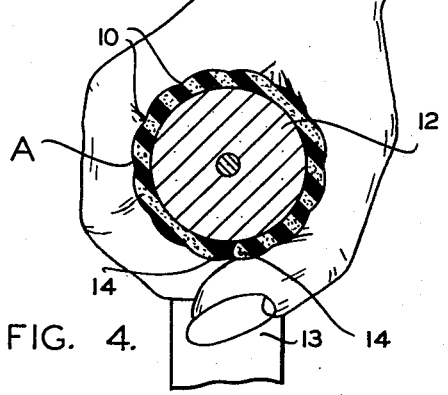
Figure 4 is a similar section showing the operator's hand engaging the cover and the handle of the iron.
Figure 6:
Figure 6 is a section on the line 6—6 of Figure 2.

In use, the cover A is stretched over the handle 12 with the skirt portions 14 depending as illustrated in Figures 1 and 3. When the hand of the operator grips the cover A, the depending skirt portions 14 will be wrapped around the under side of the handle as illustrated in Figure 4. Thus in use, the cover A extends around the handle. When the operator's hand releases its grip on the cover A, the skirt portions 14 will open again to the position illustrated in Figure 3.

Figure 2:
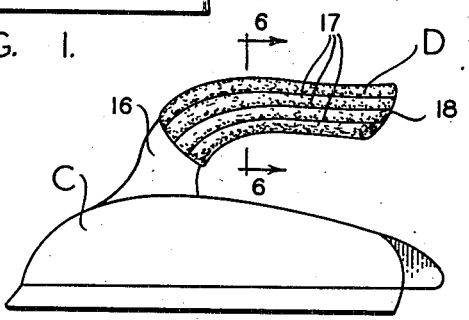
Figure 2 is a side view of another form of iron, showing another form of cover for the iron.
Figure 5:
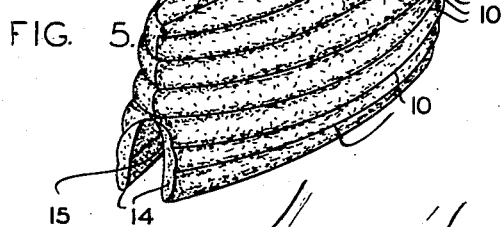
Figure 5 is a perspective of the cover shown in Figures 1, 3, and 4.

It is a feature to provide a sponge-like rubber cover A with a sufficient thickness in the body of the cover to push in the hand of the operator while gripping the iron in the operation of the same. The rubber cover A forms a nonskid gripping means as well as a cushion and a heat shield, all of which features are desirable and of primary importance.

Where the iron C is made in the form illustrated in Figure 2 and the handle 16 is formed in a horn-like design so as to be streamlined with the iron, I employ a sponge rubber-like cover D of a tubular nature which is stretched over the handle 16. The cover D is formed with longitudinal grooves 17 and may be closed or open on the end 18. The function of the cover D is the same as the cover A, namely to provide a non- skid soft or cushion-like gripping means for the operator's hand, and acting as a heat shield so that even though the handle 16 of the iron becomes quite warm, the cover D prevents the heat from being transmitted to the operator's hand.

Thus the covers A and D act as insulating means against the heat of the ordinary handle of the irons and provide a cool gripping means for the hand as well as a cushion which does not need to be as tightly gripped as ordinary handles in the operation of the iron.

I claim:

A hand grip cover for flatirons comprising a corrugated rubber body closed excepting for the bottom and open along the bottom, said opening adapting the cover to be forced over the handle to grip the handle at the closed ends thereof, and a pair of flaps extending freely from the side edges of the open-bottomed body portion, said flaps being unconnected at their ends and adapted to be brought into surrounding relation to the handle by the hand of the operator gripping the body of the cover.

BERNARD J. MURPHY.